United States Patent [19]

Wuertenberger

[11] Patent Number: 5,895,117

[45] Date of Patent: Apr. 20, 1999

[54] PROCESS FOR CORRECTLY SENSING AN OUTSIDE TEMPERATURE

[75] Inventor: Michael Wuertenberger, Unterhaching, Germany

[73] Assignee: Bayerische Motoren Werke Aktiengesellschaft, Muenchen, Germany

[21] Appl. No.: 08/877,471

[22] Filed: Jun. 17, 1997

[30] Foreign Application Priority Data

Jun. 17, 1996 [DE] Germany ............. 196 24 078

[51] Int. Cl.⁶ .................................. G01K 1/08
[52] U.S. Cl. .............................. 374/142; 374/145
[58] Field of Search .............. 374/142, 144, 374/145; 702/130; 340/449

[56] References Cited

U.S. PATENT DOCUMENTS

| | | | |
|---|---|---|---|
| 3,723,964 | 3/1973 | Lace | 340/449 |
| 4,723,527 | 2/1988 | Panten et al. | 123/571 |
| 4,745,403 | 5/1988 | Tamura | 340/713 |
| 4,770,543 | 9/1988 | Burghoff et al. | 374/142 |
| 5,080,496 | 1/1992 | Keim et al. | 374/144 |
| 5,282,386 | 2/1994 | Niemczyk et al. | 374/142 |
| 5,416,728 | 5/1995 | Rudzewicz et al. | |
| 5,737,243 | 4/1998 | Wallfafen | 374/144 |

FOREIGN PATENT DOCUMENTS

| | | |
|---|---|---|
| 41 30 680 | 3/1993 | Germany . |
| 42 14 686 | 11/1993 | Germany . |
| 195 26 946 | 2/1996 | Germany . |
| 2151862 | 7/1985 | United Kingdom ............ 374/134 |

OTHER PUBLICATIONS

T. Näbauer et al., Verkürzung der Meβzeit bei Temperaturmessungen durch rechnergestützte Auswertung des Einschwingverhaltens, Messen + Prüfen, 1984, vol. 20, No. 1/2 (pp. 30–35).

Primary Examiner—Ronald Biegel
Assistant Examiner—Paul D. Amrozowicz
Attorney, Agent, or Firm—Evenson, McKeown, Edwards & Lenahan, P.L.L.C.

[57] ABSTRACT

A process correctly senses an outside temperature. In the case of vehicles, outside temperature sensors are conventionally provided which falsify measuring results due to environmental and outside influences. For example, the engine temperature heats the temperature sensor to a different degree according to the driving speed, the driving situation and condition or, shortly after the switch-off. The process correctly senses an outside temperature, by which a signal can be formed which corresponds to the actual value of the outside temperature. The outside temperature is sensed by a temperature sensor arranged in a vehicle. A corresponding temperature signal is generated. The vehicle operating and/or vehicle condition requirements are sensed. Correction values are determined as a function of the vehicle operating and/or vehicle condition requirements. Finally, the temperature signal emitted by the temperature sensor is changed corresponding to these correction values.

8 Claims, 3 Drawing Sheets

PROCESS FOR CORRECTLY SENSING AN OUTSIDE TEMPERATURE

BACKGROUND AND SUMMARY OF THE INVENTION

This application claims the priority of German Application No. 196 24 078.6, the disclosure of which is expressly incorporated by reference herein.

The invention relates to a process for correctly sensing an outside temperature.

For sensing the outside temperature in the case of vehicles, temperature sensors are conventionally provided in the engine compartment which emit a signal corresponding to the ambient temperature. The determination of the outside temperature is required, for example, for controlling or regulating a heating or air-conditioning system of a vehicle.

It is a disadvantage in the case of the previously known systems that vehicle influences—particularly the engine heat—do not permit correct sensing of the outside temperature. As a result of the heat emitted by the engine block, the outside temperature sensor, normally housed in the engine compartment, is heated differently depending on the vehicle speed. Accordingly, the temperature sensing is correspondingly falsified.

There is therefore needed a process for correctly sensing the temperature in which errors of the above-mentioned types can be compensated as much as possible.

These needs are met according to the present invention by a process for correctly sensing the outside temperature in the case of a vehicle. The process includes the steps of: 1) sensing the outside temperature via a temperature sensor arranged in a vehicle and forming a corresponding temperature signal; 2) sensing vehicle operating and/or vehicle condition requirements; 3) determining correction values as a function of the vehicle operating and/or vehicle condition requirements; and 4) correcting the temperature signal emitted by the temperature sensor corresponding to the correction values.

In particular, this process ensures an improved outside temperature indication in problem situations, for example, in stop-and-go traffic, when parking the vehicle—for example, in an underground garage—or when taking a driving break while driving on a turnpike, etc. In accordance with the invention, the outside temperature is first sensed conventionally by means of a temperature sensor arranged in a vehicle and a corresponding temperature signal is generated. Then, the vehicle operating and/or vehicle condition requirements—such as the engine oil temperature, the coolant temperature or the vehicle speed—are sensed. By means of these vehicle operating and/or vehicle condition requirements, corresponding correction values are then determined which can be filed, for example, in a table as a function of the respective parameters. By means of the correction values, the temperature signal emitted by the temperature sensor is correspondingly changed so that finally a corrected temperature signal is present which, in fact, corresponds to the correct outside temperature.

The systematic measuring errors are therefore described by a suitable temperature model which is used for calculating the correction. In this case, this process can be used in parallel or supplementary to other constructive solutions.

When establishing the suitable temperature model, the heat transmission resistances between the different components, for example, between the engine and the engine oil or the engine oil and the cooling water system, etc. can be represented correspondingly. In the same manner, the heat capacities inherent in the different components are described by heat capacity model parts. In this manner, a "thermal replacement connection diagram" is obtained which simulates the different heat flows or heat transmissions.

Speed-dependent and vehicle-dependent parameters can be filed in characteristic curves or in tables.

If a minimal temperature is to be indicated in every case, the signal actually generated by the temperature sensor as well as the corrected signal, can be supplied to a device for forming the minimum which selects and transmits the signal corresponding to a minimal temperature.

Other objects, advantages and novel features of the present invention will become apparent from the following detailed description of the invention when considered in conjunction with the accompanying drawings.

DETAILED DESCRIPTION OF THE DRAWINGS

Figure 1:
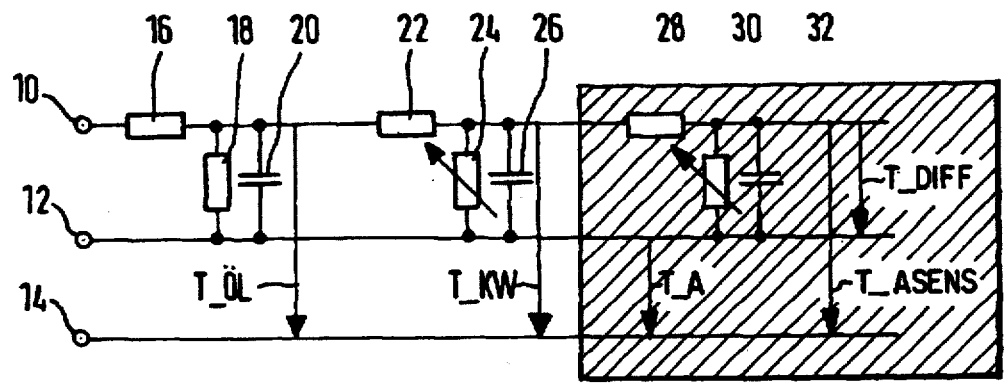
FIG. 1 is a schematic thermal replacement wiring diagram of an overall system of the engine compartment and the sensor.

For the theoretical implementation of the heat flow, FIG. 1 illustrates a thermal replacement connection diagram for an overall system of the engine compartment of a motor vehicle and an outside temperature sensor. In this case, external disturbing influences, such as wind, etc., are not yet factored into account.

Reference number 10 indicates the level of the engine combustion heat, reference number 12 indicates the outside temperature and reference number 14 indicates a reference temperature.

In the first (left) part of FIG. 1, a heat transmission model from the combustion spaces to the engine oil is illustrated. In this case, the resistances 16 and 18 represent corresponding heat transmission resistances, and the replacement connection part indicated by means of reference number 20 represents a corresponding heat capacity of the engine oil system.

The second (center) part of FIG. 1 shows a temperature model for the transmission to the cooling water, in which case the reference numbers 22 and 24 indicate the heat transmission resistances. The heat transmission resistance 24 is illustrated as a variable resistor 24 which can be changed or selected corresponding to the vehicle-specific or environment-specific conditions.

The last (right) part in FIG. 1 finally indicates the part modelled for the outside temperature which is formed by means of the heat transmission resistances 28 and 30. In this case, the heat resistance 30, in turn, is a variable resistor which can be adjusted or selected corresponding to the vehicle values and the environmental values. By means of the reference number 32, the heat capacity of the temperature sensor is simulated.

The arrow T_oil shows the temperature difference between the oil temperature and the reference temperature;

the arrow T_KW indicates the temperature difference between the cooling water and the reference temperature, and the arrow T_ASENS indicates the temperature difference between the temperature sensor and the reference temperature. The arrow T_A corresponds to the temperature difference between the outside temperature and the reference temperature, and the arrow T_DIFF corresponds to the temperature difference existing between the sensor and the environment.

By means of the heat transmission model shown in FIG. 1, with the corresponding values for the heat transmission resistances 16, 18, 22, 24, 28 and 30 as well as the heat capacitances 20, 26 and 32, the temperature transitions are indicated from the cylinders to the engine oil, from the engine oil to the cooling water and from the sensor to the environment. In this case, the systematic errors are described which take place by the heating of the sensor by means of the engine heat. It should be noted that the heat transmission resistance between the sensor and the environment depends considerably on the air flow-around, that is, in the first approximation, on the vehicle speed.

Independently of the constructive measures, it is to be attempted by means of the present process to describe the sensor with its surrounding field and the systematic measuring errors mathematically by means of a model. In a separate step, after the identification of the model parameters, an error acknowledgment or error correction is implemented. For this purpose, the parameters are identified. This may be determined specifically for each vehicle. During this specification, the above-mentioned heat transmission resistances and the heat capacities are determined. The determination takes place by means of measurements with the aid of an optimizing process (for example, Simplex Downhill) on the basis of a square effectiveness criterion. By means of the square effectiveness criterion, it is avoided that errors cancel one another out.

Speed-dependent and vehicle-dependent parameters are stored in a characteristic curve which, corresponding to the detected speed, supplies a corresponding parameter value. In the case of the present process, eight support points are provided for defining the characteristic curve. As an alternative, a table can naturally also be used in which, corresponding to the speeds, the corresponding speed-dependent and vehicle-dependent parameters are stored.

Figure 2:
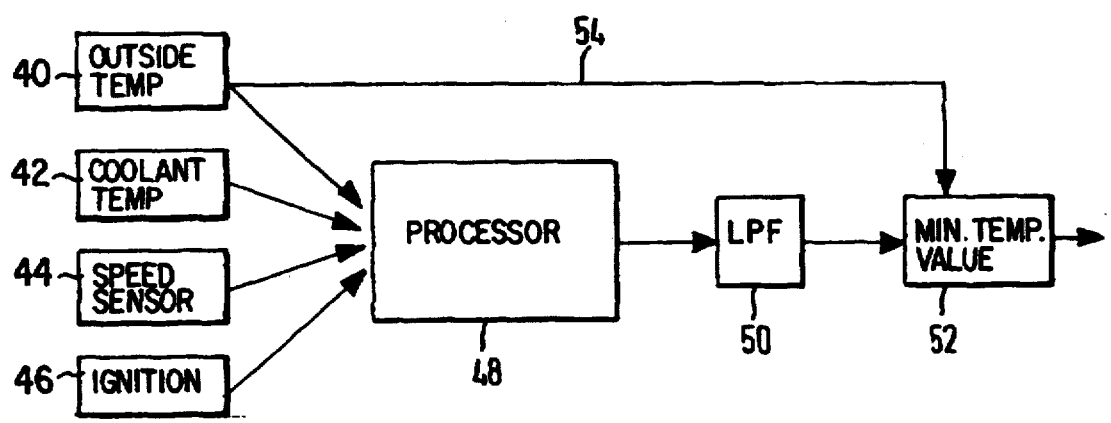
FIG. 2 is a schematic block diagram for implementing the process according to the invention.

In a very schematic form, FIG. 2 shows an embodiment of an implementation of the above-mentioned process. In this case, reference numbers 40, 42, 44 and 46, in this sequence, indicate an outside temperature sensor, a coolant temperature sensor, a speed sensor as well as a sensing device which indicates whether the ignition is on or off. All signals of the above-mentioned sensors or sensing devices are transmitted to a computer unit 48 which, on the basis of the coolant temperature, the speed and the terminal sensing as well as while taking into account stored, specific parameters, carries out a correction of the outside temperature signal. This outside temperature signal is then supplied to a low pass filter 50 which transmits the signal to a device 52. The device 52 is provided for forming a minimum temperature value, specifically between the corrected temperature signal from the low pass filter 50 as well as the direct temperature signal of the outside temperature sensor 40 which, by way of the line 54, is provided to the sensing device 52. The sensing device 52 finally emits the minimal temperature value so that the latter is always present.

Figure 3:
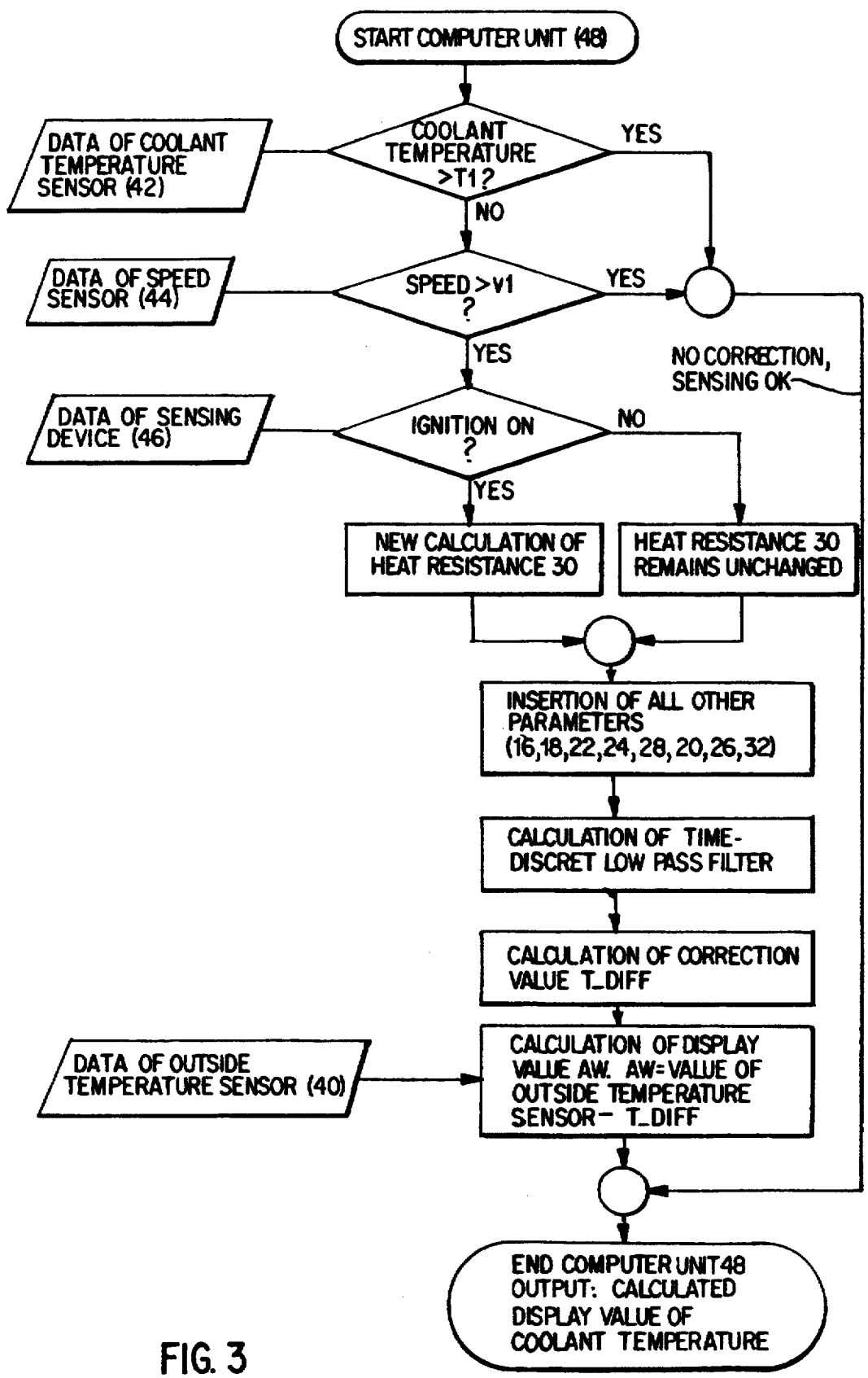
FIG. 3 is a flow chart illustrating the operation of the computer for calculating a value of a coolant temperature.

Referring to FIG. 3, the flow chart illustrates the operation of the computer unit or processor 48. After the computer unit 48 is started, the computer unit compares whether the coolant temperature from the coolant temperature sensor 42 is greater than a certain temperature T1. Thereafter, the process compares whether the speed from the speed sensor 44 is greater than a certain velocity v1. If either of the above criteria is satisfied, then no correction is necessary since the sensing is considered to be correct. If neither criteria is satisfied however, then the processor checks whether the ignition is on based on the signal from the ignition sensor 46. If the ignition is off, then the heat resistance 30 remains unchanged. However, if the ignition is on, then the processor calculates a new heat resistance 30 in accordance with the following formula:

$$R30 = r0 + r1/v + r3/v^3,$$

wherein r0, r1 and r3 are certain resistance values and v is the speed of the speed sensor 44.

After the calculation of the new heat resistance 30, all of the other parameters 16, 18, 22, 24, 28, 20, 26 and 32 are factored into account via the processor 48. Then, the operation of the time-discrete low pass filter 50 occurs and the calculation of the correction value T_DIFF is performed.

Based on the calculation of the correction value T_DIFF and data from the outside temperature sensor 40, a display value AW is calculated in accordance with the following:

$$AW = \text{value of outside temperature sensor} - T\_DIFF.$$

Finally, the processor 48 outputs a calculated display value of the coolant temperature.

Figure 4:
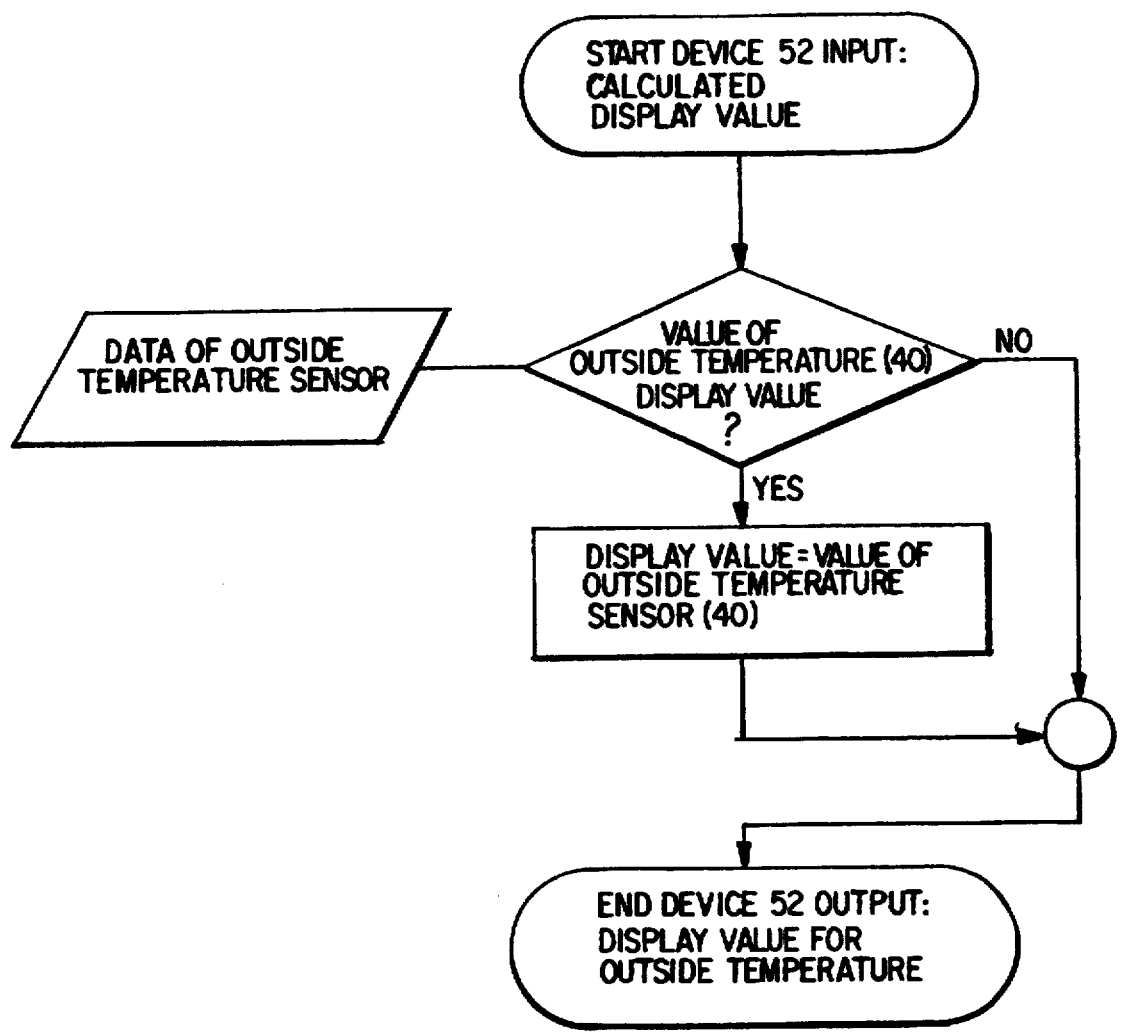
FIG. 4 is a flow chart illustrating the operation of the device for forming a minimum temperature value.

Referring to FIG. 4, there is shown a flow chart illustrating the operation of the device 52. Initially, the calculated display value is input to the device 52. There, the calculated display value is compared with the value of the outside temperature sensor 40. If the value of the outside temperature sensor 40 is lower than the calculated display value, then the display value is set to equal the value of the outside temperature sensor 40. However, if the outside temperature value is not lower than the calculated display value, then no change is made to the display value.

Finally, the device 52 outputs the display value for the outside temperature.

On the whole, by means of the present invention, a process is provided which permits the emission of a correct outside temperature signal in that environmental influences, such as the influence of the engine heat on the outside temperature sensor is taken into account in a parallel-operating model and corresponding corrections are carried out on the temperature signal. The temperature signal will then correspond to the actual outside temperature so that the devices to be controlled by it, such as the heating or air-conditioning system can operate correctly.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for correctly sensing an outside temperature in the case of a vehicle, the process comprising the steps of:

sensing the outside temperature via a temperature sensor arranged in the vehicle and forming a corresponding temperature signal;

sensing at least one of vehicle operating and vehicle condition requirements;

determining a correction value as a function of the at least one of vehicle operating and vehicle condition requirements, said correction value being indicative of a magnitude of an error in said temperature signal; and correcting said temperature signal emitted by the temperature sensor as a function of the correction value.

2. The process according to claim 1, wherein in said sensing step of the vehicle operating and vehicle condition requirements, at least one of a coolant temperature, an engine oil temperature and a vehicle speed are taken into account.

3. The process according to claim 1, wherein in said step of determining a correction value, at least certain heat transmission resistances between an engine of the vehicle and a coolant system, the engine and an outside environment, as well as the temperature sensor and the outside environment, and heat capacities of the engine and the temperature sensor, are assumed.

4. The process according to claim 2, wherein in said step of determining a correction value, at least certain heat transmission resistances between an engine of the vehicle and a coolant system, the engine and an outside environment, as well as the temperature sensor and the outside environment, and heat capacities of the engine and the temperature sensor, are assumed.

5. The process according to claim 3, wherein the heat transmission resistances and the heat capacities are determined experimentally in a vehicle-specific manner.

6. The process according to claim 4, wherein the heat transmission resistances and the heat capacities are determined experimentally in a vehicle-specific manner.

7. The process according to claim 1, wherein characteristic curves are used for speed-dependent parameters.

8. The process according to claim 1, wherein the temperature signal generated by the temperature sensor, as well as a corrected signal, are supplied to a device for forming a minimum temperature value which selects and transmits a further signal corresponding to a minimum temperature.

* * * * *

UNITED STATES PATENT AND TRADEMARK OFFICE
CERTIFICATE OF CORRECTION

PATENT NO. : 5,895,117
DATED : April 20, 1999
INVENTOR(S) : Michael Wuertenberger Page 1 of 1

It is certified that error appears in the above-identified patent and that said Letters Patent is hereby corrected as shown below:

Figure 3, last box of flow chart, change "END" to --AND-- and change "COOLANT" to --OUTSIDE--.

Column 4,
Line 29, change "coolant" to --outside--.

Signed and Sealed this

Twenty-sixth Day of June, 2001

Attest:

Attesting Officer

NICHOLAS P. GODICI
*Acting Director of the United States Patent and Trademark Office*